No. 11,844. Reissued Aug. 7, 1900.

G. E. SEYMOUR & F. KAHLER.

EXTENSION PLATFORM.

(Application filed July 18, 1900.)

2 Sheets—Sheet 1.

Witnesses:
Raphael Netter
C. D. Morrill

Inventors
George E. Seymour
Ferdinand Kahler
by Henry E. Newbury Att'y

No. 11,844. Reissued Aug. 7, 1900.

G. E. SEYMOUR & F. KAHLER.

EXTENSION PLATFORM.

(Application filed July 18, 1900.)

2 Sheets—Sheet 2.

Witnesses:
Raphael Netter
C. D. Morrill

Inventors
George E. Seymour
Ferdinand Kahler
by Henry L. Newbury Atty

UNITED STATES PATENT OFFICE.

GEORGE E. SEYMOUR AND FERDINAND KAHLER, OF NEW ALBANY, INDIANA.

EXTENSION-PLATFORM.

SPECIFICATION forming part of Reissued Letters Patent No. 11,844, dated August 7, 1900.

Original No. 635,401, dated October 24, 1899. Application for reissue filed July 18, 1900. Serial No. 23,984.

*To all whom it may concern:*

Be it known that we, GEORGE E. SEYMOUR and FERDINAND KAHLER, of New Albany, in the county of Floyd and State of Indiana, have invented certain new and useful Improvements in Extension-Platforms; and we do hereby declare the following to be a full, clear, and exact description of the invention, such as will enable others skilled in the art to which it appertains to make and use the same.

Our invention relates to an improvement in extension-platforms for railway-cars, one object of the invention being to so construct a device of the above-mentioned character that it can be readily raised or lowered and firmly held in either position.

A further object is to provide an extension-platform which will be extremely simple in construction, neat in appearance, cheap to manufacture, easy to operate, and most effectual when in use.

With these objects in view the invention consists in certain novel features of construction and combinations and arrangements of parts, as will be more fully hereinafter described, and pointed out in the claims.

Figure 1:
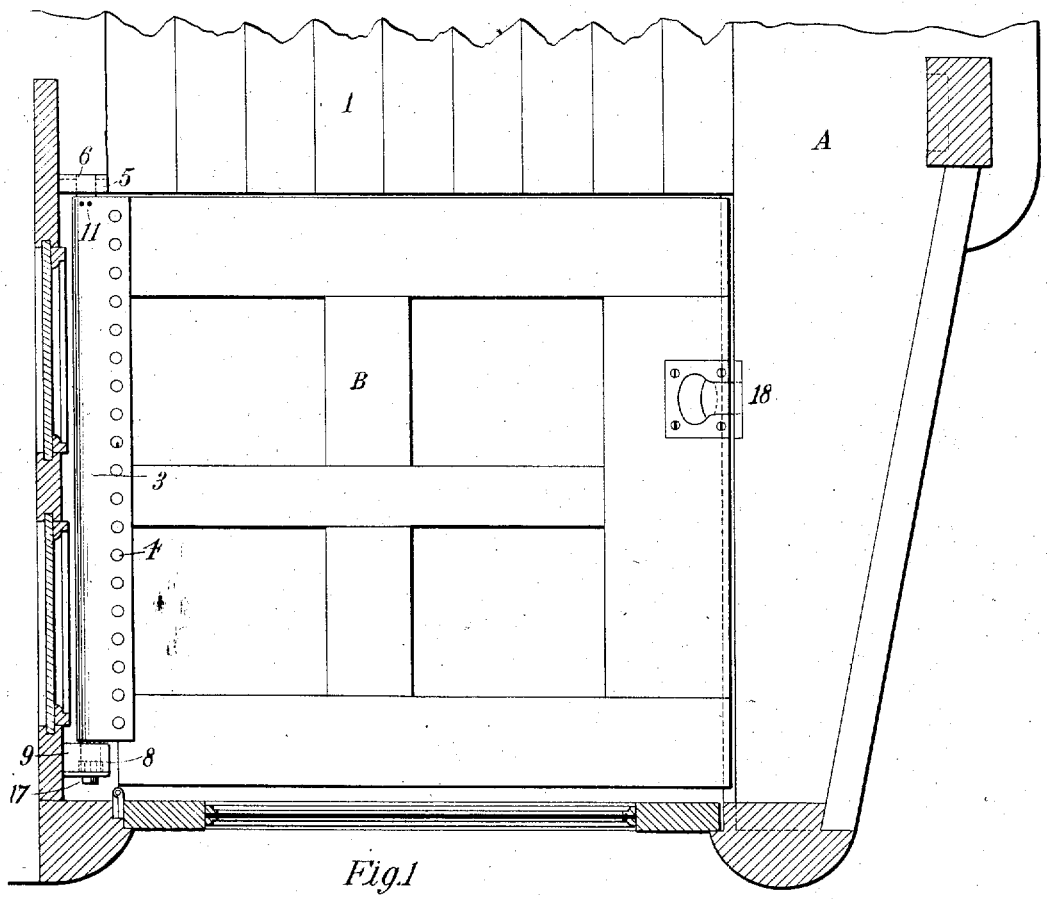
Figure 2:
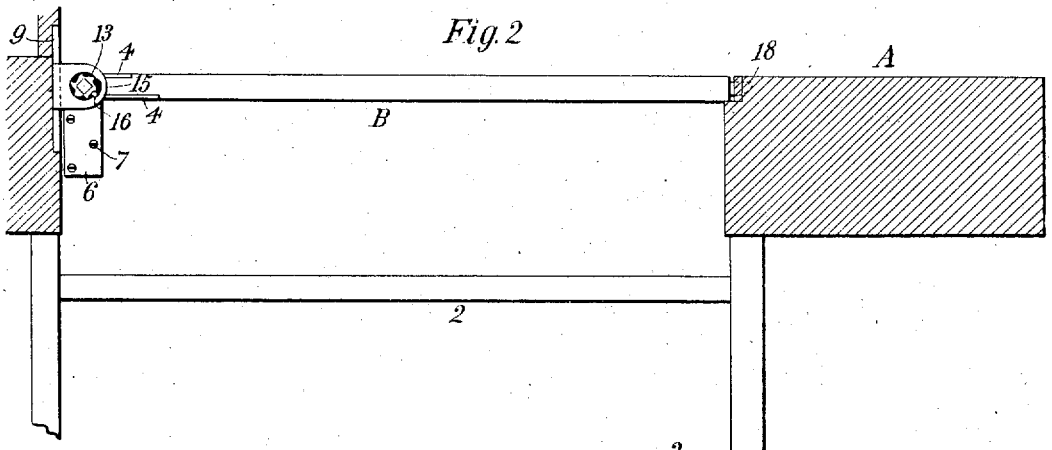
Figure 3:
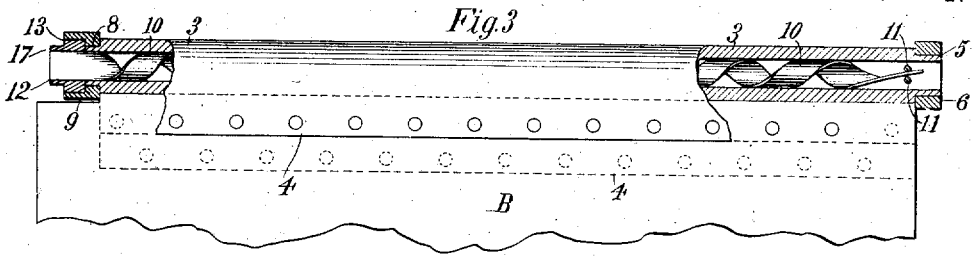

In the accompanying drawings, Figure 1 is a plan view illustrating our improvements. Fig. 2 is a side view of the same, and Figs. 3, 4, 5, 6, 7, and 8 are views of details.

A represents one end of a car, 1 a platform therefor, and 2 steps on one side of said platform. An extension-platform or trap-door B is hinged to the end of the car, as will now be described.

A tube 3, having parallel strips 4 thereon to receive the edge of the door, is secured to the door by means of bolts or screws passing through the strips 4 and into the door. The ends of the tube 3 are contracted to form journals, one of which is disposed in a socket 5 in a bracket 6, secured to the car-platform 1 by means of screws or nails 7. The journal at the other end of the tube 3 is disposed in a socket 8 in a bracket 9, secured to the end of the car. A ribbon or torsional spring 10 is disposed in the tube 3 and secured against rotation by a pin or pins 11 passing through the sleeve, and the other end of the spring projects through the socket 8 in the bracket 9 and is disposed in an elongated slot 12 in a ratchet-wheel 13, which latter is disposed in a casing 14 in the bracket 9. One side of the casing 14 is cut out or recessed to form a guide-way 15 for the accommodation of a pin or roller 16. The pin 16 is adapted to be engaged by one of the teeth on the ratchet-wheel 13 to hold the spring at any tension, but will permit the ratchet-wheel to be turned to increase the tension of the spring. An angular enlargement 17 is provided on the ratchet-wheel 13 to receive a suitable tool for turning it, and a ring 18[a] is secured to the bracket 9 and incloses the ratchet-wheel to prevent displacement of the latter.

Any approved catch 18 may be employed for locking the door in position over the steps.

Figure 4:
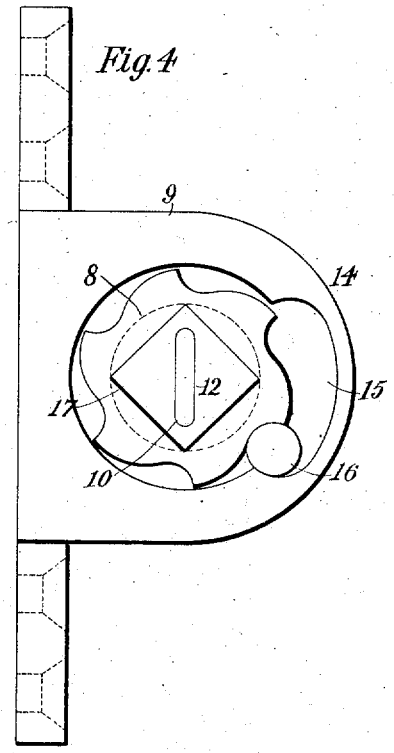
Figure 5:
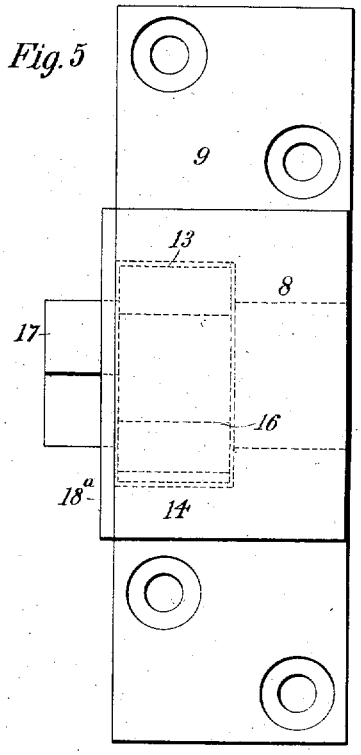
Figure 6:
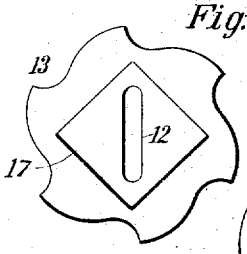
Figure 8:
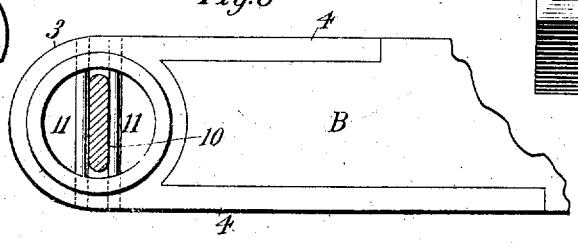
Figure 7:
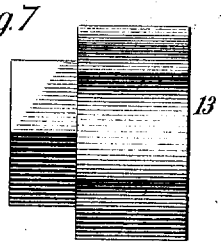

It will be observed with the parts arranged and combined as thus described that the spring is secured to the tube 3 at one end, which tube in turn is secured to the extension-platform, so that the end of the spring is thus secured to the platform and moves with it whenever the platform moves; also, that the spring is connected to the car at its other end through the hollow journal disposed in the socket 8 of the bracket 9 by means of ratchet-wheel 13 and pin or roller 16, disposed in the casing 14 of bracket 9, which is secured to the car, as shown in Figs. 2, 4, and 5, the ratchet-wheel, pin, and casing, with the squared or angular enlargement 17, forming means by which the tension of the spring may be adjusted as desired by the application of a suitable tool to such enlargement.

Various slight changes might be resorted to in the general form and arrangement of the several parts described without departing from the spirit and scope of our invention, and hence we would have it understood that we do not wish to limit ourselves to the precise details set forth, but consider ourselves at liberty to make such slight changes and alterations as fairly fall within the spirit and scope of our invention.

Having fully described our invention, what we claim as new, and desire to secure by Letters Patent, is—

1. The combination with a car, substantially as set forth, of an extension-platform, journals attached to said platform, one of which is hollow, sockets attached to the car and adapted to receive the journals, a spring secured at one end to the platform and connected to the car at the other end through the hollow journal, and means for adjusting the tension of the spring.

2. The combination with a car, substantially as set forth, of an extension-platform, journals secured to the platform by a strip to which the journals are first attached, one of which journals is hollow, sockets attached to the car and adapted to receive the journals, and a spring secured at one end to the platform and connected to the car at the other end through the hollow journal.

3. The combination with a car, of a platform extension a tube secured to one end of said platform extension, journals at the ends of the tube, a spring secured in the tube and projecting therefrom and means for regulating the tension of said spring.

4. The combination with a car, of a platform extension a tube secured to one edge of the platform extension and having journals at its ends, a spring secured at one end in the tube and projecting at its other end beyond the tube, a ratchet-wheel secured to the end of the spring and means for preventing the turning of said ratchet-wheel in one direction.

5. The combination with a car-platform, of an extension for said platform, a tube having flanges secured to one edge of the extension, journals at the ends of said tube, bearings for said journals, a torsional spring disposed in said tube and secured at one end in one end of the tube and projecting beyond the other end of the tube, a ratchet-wheel secured to the projecting end of the spring and having an angular extension and a pin to engage the teeth of said ratchet-wheel.

In testimony whereof we have signed this specification in the presence of two subscribing witnesses.

GEORGE E. SEYMOUR.
FERDINAND KAHLER.

Witnesses:
GEORGE B. MCINTYRE,
JOHN B. JAMES.